June 30, 1959 G. S. SPENCER 2,892,521
TWO-SPEED TRANSMISSION FOR VEHICLES
Filed July 8, 1957 2 Sheets-Sheet 1
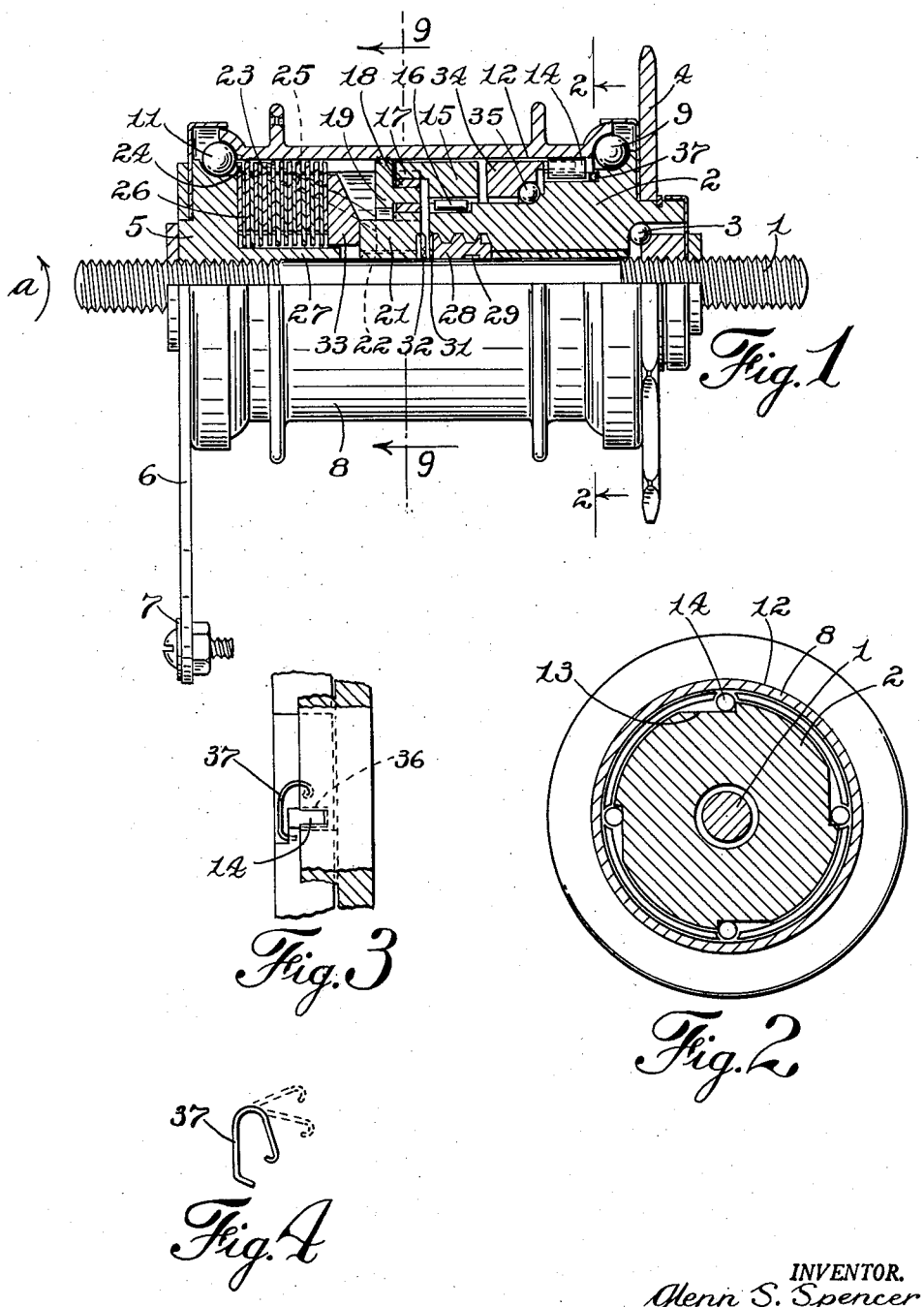
INVENTOR.
Glenn S. Spencer
BY
Clinton S. James
ATTORNEY
WITNESS:
Esther M. Stockton June 30, 1959 — G. S. SPENCER — 2,892,521
TWO-SPEED TRANSMISSION FOR VEHICLES
Filed July 8, 1957 — 2 Sheets-Sheet 2
Fig. 5
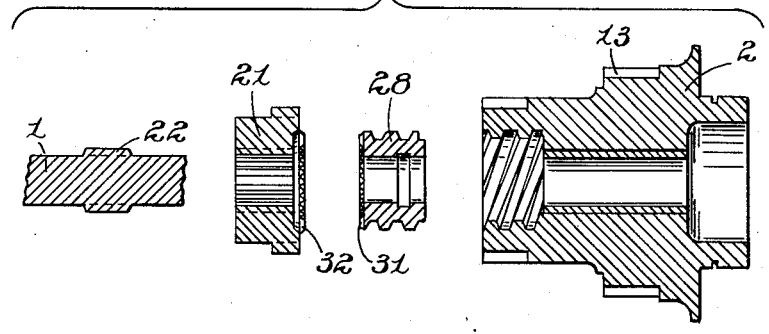
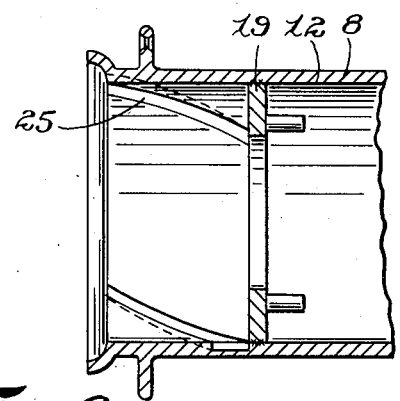
Fig. 6
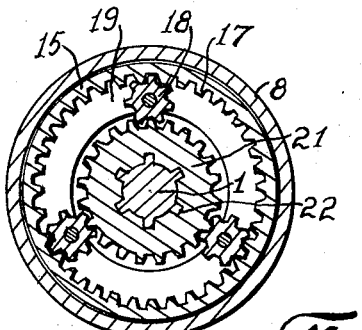
Fig. 9
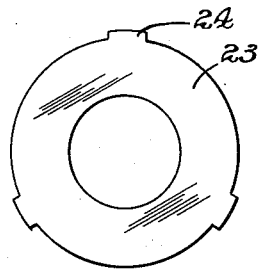
Fig. 7
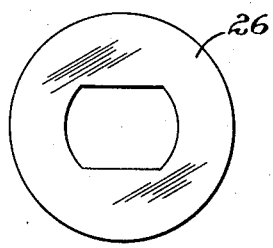
Fig. 8
WITNESS:
Esther M. Stockton
INVENTOR.
Glenn S. Spencer
BY
Clinton S. Janes
ATTORNEY United States Patent Office 2,892,521
Patented June 30, 1959

2,892,521

TWO-SPEED TRANSMISSION FOR VEHICLES

Glenn S. Spencer, Horseheads, N.Y., assignor to Bendix Aviation Corporation, Elmira Heights, N.Y., a corporation of Delaware Application July 8, 1957, Serial No. 670,498

7 Claims. (Cl. 192—6)

The present invention relates to a two-spaced transmission for velocipedes and the like, and more particularly a rear wheel hub incorporating a semi-automatic type of change speed gearing together with a back-pedaling brake.

It is an object of the present invention to provide a novel transmission of this type which is rugged in construction, reliable in operation and simple and economical to manufacture.

It is another object to provide such a device which is a self-contained unit requiring no external controlling mechanism.

It is another object to provide such a device in which the desired gear ratio is readily selected and rendered effective by the operator.

It is another object to provide such a device in which no frictional controlling devices are required in connection with the gear selecting mechanism.

It is another object to provide such a device including a novel brake mechanism which incorporates a self-energizing feature.

It is another object to provide such a device having a multiple disc structure so constituted as to tend to equalize the load and wear of the brake discs.

Further objects and advantages will be apparent from the following description taken in connection with the accompanying drawing in which:

Fig. 1 is a side elevation partly broken away and in section of a two-speed transmission and coaster brake forming a preferred embodiment of the invention;

Fig. 2 is a section taken substantially on the line 2—2 of Fig. 1;

Fig. 3 is a fragmentary detail of a portion of the high speed clutch showing the driving member, a clutch roller, and the weighted annulus controlling the clutch roller;

Fig. 4 is a detail in perspective of the spring acting on the clutch controlling annulus;

Fig. 5 is an exploded sectional view of the driving member and the parts of the brake actuating means;

Fig. 6 is a sectional detail of the wheel hub showing the helical splines for the brake discs;

Fig. 7 is a detail of one of the brake discs splined in the hub;

Fig. 8 is a detail of a companion disc splined on the brake anchor member; and

Fig. 9 is a section taken substantially on the line 9—9 of Fig. 1.

In Fig. 1 of the drawing there is illustrated a fixed axle 1 which is adapted to be mounted in the rear fork of a bicycle frame in the usual manner. A driving member 2 is rotatably mounted on the axle near one end as by means of bearing 3 and is adapted to be rotated by means of a sprocket 4 fixedly mounted thereon in any suitable manner. A brake anchor member 5 is threaded on the other end of axle 1, and is prevented from rotation by a brake arm 6 which is adapted to be connected to the frame of the bicycle to transmit the braking torque thereto by means of a clip 7 in the customary way.

A wheel hub 8 is rotatably mounted on the driving member 2 and anchor member 5 as by means of bearings 9 and 11 respectively. The hub is provided with a cylindrical interior surface 12. The driving member 2 is formed with a plurality of circumferentially tapered seats 13 (Fig. 2), and overrunning clutch rollers 14 are located in said seats, the parts being so dimensioned that when the rollers 14 are in the bottoms of the seats, they are free from contact with the hub, but when the rollers move toward the shallow portions of the seat they wedge against the interior surface 12 of the hub and thereby transmit the rotation of the driving member to the hub.

A low speed or reduction gear drive from the driving member to the hub is provided comprising a low speed driven clutch member 15 having an overrunning clutch connection with the driving member through clutch rollers 16. The member 15 includes an orbit gear 17 which meshes with a plurality of planet pinions 18 mounted on a planet carrier 19 which is fixedly attached in any suitable manner as by brazing to the interior of the hub 8. The planets 18 also mesh with a sun gear 21 which is splined on the axle as indicated at 22.

Braking means for the hub are provided comprising a set of discs 23 (Fig. 7) having radial lugs 24 which are slidably received in helical spline grooves 25 (Fig. 6) in the interior of the hub, and a second set of discs 26 (Fig. 8) alternating with the discs 23, and slidably but non-rotatably mounted on a flatted section 27 of the anchor member 5.

Means for actuating the brake by compressing the pack of discs 23, 26 is provided comprising a screw shaft 28 slidably journalled on the axle 1 and frictionally connected therewith by means of a retarder 29. The screw shaft 28 is threaded in a counterbore in the driving member 2 whereby relative rotation causes translation of the screw shaft, the angle of the threads being such that backward rotation of the driving member causes the screw shaft to be projected outwardly from the driving member.

The screw shaft 28 is provided with clutch teeth 31 adapted to engage similar clutch teeth 32 on the sun gear 21 when the screw shaft is so projected to the left in Fig. 1 by backward rotation of the driving member. A thrust ring 33 is slidably mounted on the end of the section 27 of the anchor member 5 for transmitting movement of the sun gear 21 to the brake discs to compress the discs and thereby retard rotation of the hub.

As best shown in Figs. 1 and 6, the spline grooves 25 in the hub 8 are so inclined that when torque is transmitted from the hub to the discs 23 by means of the lugs 24, an axial thrust is produced which tends to assist the movement of the discs in the direction of the compressive force applied by the brake operating means. Thus, in the structure as illustrated, if the hub is rotating forwardly in the direction of the arrow (a), when the brake is applied, the compressive force transmitted through the thrust ring 33 will be assisted by the axial component of the force applied to the discs 23 by the hub 8. The amount of this self-energizing or servo action is controlled by the inclination of the spline grooves 25. It is presently preferred that this additional assisting force or servo action be substantially equivalent to the frictional resistance to axial movement of the discs due to their binding action on the hub and the anchor member, whereby the pressure of the thrust ring is applied substantially equally to all the discs.

Means under the control of the operator are provided for selectively rendering operative the high speed or the reduction gear drive from the driving member 2 to the hub 8. For this purpose, a weighted annular cage member 34 is rotatably mounted on the driving member 2 as by means of a bearing 35 and is provided with pockets 36 (Fig. 3) loosely receiving the high speed clutch rollers 14. The cage 34 is connected to rotate with the driving member 2 by means of one or more spring members 37 which are anchored at their ends to the two members and are tensioned to contract as indicated at Fig. 4, such contraction being arranged to move the cage in the direction to hold the rollers 14 at the bottom of the seats in the driving member as shown in Fig. 2. The cage 34 however is formed as shown in section in Fig. 1 so as to have a substantial amount of rotational inertia. Consequently, in case the driving member 2 is accelerated rapidly, the cage 34 will lag behind against the force of the springs 37, thus permitting the rollers 14 to move into their wedging positions to transmit the rotation of the driving member to the hub 8.

In operation, starting with the parts in the positions illustrated in Figs. 1 and 2, rotation of the driving member 2 in a forward direction will be transmitted through the low speed overrunning clutch rollers 16 to orbit gear 17, and through the planet pinions 18 and planet carrier 19 to the hub 8 since the sun gear 21 is prevented from rotation by its splined connection 22 with the axle 1. The bicycle will thus be propelled in low gear.

When the operator desires to drive the hub 8 directly from the driving member 2, he arrests the movement of the driving member for an instant, or may back-pedal slightly, and then pedals forward smartly. The cage 34 then lags behind the driving member, permitting the high speed clutch rollers 14 to engage and drive the hub, which engagement will be maintained as long as the operator continues to pedal forwardly.

To shift to low gear it is merely necessary for the operator to stop pedalling forwardly for an instant, permitting the springs 37 to actuate the cage 34 to withdraw the high speed clutch rollers 14. When pedalling is then resumed in a normal manner the low speed clutch rollers 16 will engage and drive the hub through the reduction gearing.

When it is desired to retard the motion of the bicycle, backward rotation of the driving member causes the screw shaft 28 to be projected into clutching engagement with the sun gear 21, and thereafter to apply pressure to the sun gear which is transmitted through the pressure ring 33 to the brake discs 23, 26. It will be appreciated that since the reluctance of the discs to move axially while transmitting braking torque is substantially balanced or overcome by the servo action of the brake discs due to the helical splines in the hub, the pressure throughout the pack of brake discs will be approximately uniform, and uneven wear and concentrated loading of the discs is avoided.

Although but one embodiment of the invention has been shown and described in detail it will be understood that changes may be made in the design and arrangement of the parts without departing from the spirit of the invention.

I claim:

1. In a two-speed transmission for velocipedes and the like, a fixed axle, a driving member rotatably mounted thereon, a wheel hub rotatably mounted on the driving member, a high-speed overrunning clutch connection from the driving member to the hub including a high-speed driving clutch member movable into and out of operative position, a low-speed connection from the driving member to the hub including an overrunning clutch and reduction gearing driven thereby, yielding means urging the high-speed clutch member away from its operative position, and inertia means responsive to acceleration of the driving member for overcoming said yielding means and moving the high-speed clutch member into operative position.

2. A transmission as set forth in claim 1 in which the high-speed overrunning clutch includes a plurality of rollers movable rotarily into and out of operative position, a weighted cage member rotatably mounted on the driving member having means for positioning said rollers, and spring means urging said cage member to rotate with respect to the driving member, in a direction to move said rollers into inoperative position.

3. In a two-speed transmission for velocipedes and the like a fixed axle, a driving member rotatably mounted thereon, a wheel hub having a cylindrical interior surface rotatably mounted on the driving member, said driving member having a plurality of circumferentially tapered seats facing the interior surface of the hub, clutch rollers in said seats movable into and out of engagement with the hub, and means for controlling the operation of the rollers including yielding means holding the rollers out of operative engagement with the hub, and means responsive to acceleration of the driving member for overcoming the yielding means and moving the rollers into operative position.

4. A two-speed transmission as set forth in claim 3 in which the means for controlling the clutch rollers comprises a weighted annular cage member rotatably mounted on the driving member having pockets loosely receiving the rollers, and spring means urging the cage in the direction to hold the rollers against the bottoms of their seats.

5. A transmission as set forth in claim 3 including further brake means for the hub comprising an anchor member and means responsive to backward rotation of the driving member for frictionally connecting the hub to the anchor member.

6. In a transmission and hub brake for velocipedes and the like a fixed axle, a driving member rotatably mounted thereon, an anchor member non-rotatably mounted on the axle, a wheel hub rotatably mounted on the driving member and anchor member, stationary and rotary sets of brake discs splined alternately to the hub and the anchor member and means responsive to backward rotation of the driving member for compressing said discs, the splined connection of one set of said discs being spirally inclined in the direction to cause torque transmitted therethrough from the hub to increase the compression of the discs.

7. In a transmission and hub brake for velocipedes and the like a fixed axle, a driving member rotatably mounted thereon, an anchor member non-rotatably mounted on the axle, a wheel hub rotatably mounted on the driving member and anchor member, stationary and rotary sets of brake discs splined alternately to the hub and the anchor member and means responsive to backward rotation of the driving member for compressing said discs, one set of said discs being spirally splined in the direction to cause torque transmitted therethrough to increase the compression of the discs; in which the interior of the hub is provided with helical spline grooves, and one set of brake discs is formed with a plurality of peripheral lugs slidably received in the grooves, the curvature of the helical grooves being such that the axial thrust produced by the transmission of braking torque is in the direction to increase the compression of the discs.

References Cited in the file of this patent

UNITED STATES PATENTS

| 2,180,527 | Jones | Nov. 21, 1939 |
| 2,529,216 | Hood | Nov. 7, 1950 |
| 2,747,708 | Peterson | May 29, 1956 |